(12) United States Patent
He

(10) Patent No.: US 11,839,295 B2
(45) Date of Patent: Dec. 12, 2023

(54) SUPPORTING DEVICE FOR MOBILE TERMINAL

(71) Applicant: SHENZHEN LEMORE MARKETING CONSULTANCY CO.,LTD, Shenzhen (CN)

(72) Inventor: Jiajia He, Liuzhou (CN)

(73) Assignee: SHENZHEN LEMORE MARKETING CONSULTANCY CO., LTD, Shenzhen (CN)

( * ) Notice: Subject to any disclaimer, the term of this patent is extended or adjusted under 35 U.S.C. 154(b) by 49 days.

(21) Appl. No.: 17/631,451

(22) PCT Filed: Aug. 12, 2020

(86) PCT No.: PCT/CN2020/108559
§ 371 (c)(1),
(2) Date: Jan. 29, 2022

(87) PCT Pub. No.: WO2021/027825
PCT Pub. Date: Feb. 18, 2021

(65) Prior Publication Data
US 2022/0273096 A1 Sep. 1, 2022

(30) Foreign Application Priority Data

Aug. 14, 2019 (CN) .......................... 201921318297.0

(51) Int. Cl.
*A47B 23/04* (2006.01)
*F16M 11/38* (2006.01)
*F16M 13/00* (2006.01)

(52) U.S. Cl.
CPC ........... *A47B 23/044* (2013.01); *F16M 11/38* (2013.01); *F16M 13/005* (2013.01)

(58) Field of Classification Search
CPC .... A47B 23/043; A47B 23/044; F16M 11/38; F16M 13/005
(Continued)

(56) References Cited

U.S. PATENT DOCUMENTS 8,640,864 B2 * 2/2014 Chen ..................... G06F 1/1628
206/320
8,875,879 B2 * 11/2014 Diebel .................. G06F 1/1626
206/45.24
(Continued)

FOREIGN PATENT DOCUMENTS

CN 202331297 U 7/2012
CN 202421941 U 9/2012
(Continued)

*Primary Examiner* — Alfred J Wujciak
(74) *Attorney, Agent, or Firm* — Bayramoglu Law Offices LLC

(57) ABSTRACT

A supporting device for a mobile terminal is provided. The supporting device includes a main board body, a connecting board assembly, a first supporting body and a second supporting body. One end of the main board body is connected with one end of the connecting board assembly through a first bendable part, the other end of the connecting board assembly is connected with one end of the first supporting body through a second bendable part, the other end of the first supporting body is connected with one end of the second supporting body through a third bendable part, and the other end of the main board body is connected with the other end of the second supporting body through a fourth bendable part. The supporting device for the mobile terminal of this application is small in size and convenient to carry.

12 Claims, 5 Drawing Sheets

(58) Field of Classification Search
USPC .............................. 248/441.1, 447, 459, 460
See application file for complete search history.

(56) References Cited

U.S. PATENT DOCUMENTS

| | | | | |
|---|---|---|---|---|
| 8,985,543 | B2 * | 3/2015 | Chen | F16M 11/10 |
| | | | | 206/45.24 |
| D805,519 | S * | 12/2017 | Diebel | H04B 1/3888 |
| | | | | D14/440 |
| RE48,041 | E * | 6/2020 | Wu | G06F 1/16 |
| D894,890 | S * | 9/2020 | Lederer | D14/253 |
| D934,230 | S * | 10/2021 | He | D14/447 |
| 11,209,870 | B1 * | 12/2021 | Li | F16M 11/10 |
| 2015/0216064 | A1 * | 7/2015 | Wu | F16M 13/00 |
| | | | | 248/346.3 |
| 2016/0088750 | A1 * | 3/2016 | Wu | H05K 5/0086 |
| | | | | 248/688 |
| 2016/0377220 | A1 * | 12/2016 | Lin | F16M 11/10 |
| | | | | 248/176.3 |
| 2019/0059576 | A1 | 2/2019 | Culver et al. | |

FOREIGN PATENT DOCUMENTS

| | | |
|---|---|---|
| CN | 202838118 U | 3/2013 |
| CN | 204102029 U | 1/2015 |
| CN | 204557302 U | 8/2015 |
| CN | 210007755 U | 1/2020 |
| CN | 305716055 S | 4/2020 |
| CN | 305716056 S | 4/2020 |
| CN | 305716057 S | 4/2020 |
| CN | 210831087 U | 6/2020 |
| CN | 211040335 U | 7/2020 |
| CN | 211059612 U | 7/2020 |
| CN | 211059727 U | 7/2020 |
| CN | 211059738 U | 7/2020 |
| KR | 20130002955 U | 5/2013 |

* cited by examiner

SUPPORTING DEVICE FOR MOBILE TERMINAL

CROSS REFERENCE TO THE RELATED APPLICATIONS

This application is the national phase entry of International Application No. PCT/CN2020/108559, filed on Aug. 12, 2020, which is based upon and claims priority to Chinese Patent Application No. 201921318297.0, filed on Aug. 14, 2019, the entire contents of which are incorporated herein by reference.

TECHNICAL FIELD

This application relates to the technical field of supporting devices, and in particular, relates to a supporting device for a mobile terminal.

BACKGROUND

With the advent of the era of mobile Internet, various kinds of mobile terminals are constantly emerging, and they have almost become a part of life of modern people. At present, there are many kinds of mobile terminals in the market, such as mobile phones, tablet computers, notebooks and so on. Because this type of mobile terminals features a small size, a light weight, a fashionable appearance, portability and so on, they are deeply loved by people and closely related to people's life.

People are prone to neck fatigue when using the aforesaid mobile terminal, and the user needs to lean forward to read if the mobile terminal is placed flat on the desktop for use, which is likely to cause back discomfort. Furthermore, the projection of light sources such as electric lights on the screen of the mobile terminal will cause screen reflection and interfere with reading and operation, so it is usually necessary for the mobile terminal to stand up with an inclined angle for convenient use in order to facilitate reading and operation.

However, the existing products supporting the mobile terminal are all products related to protective covers, and the existing product with a protective cover is folded to form a supporting structure. However, the size of the product with the protective cover is too large, and this makes it inconvenient to store and carry, thus causing inconvenience and trouble in use.

SUMMARY

This application provides a supporting device for a mobile terminal to solve the problem that the supporting device is bulky and inconvenient to carry in the prior art.

In order to solve the above technical problems, a technical solution adopted by this application is to provide a supporting device for a mobile terminal, the supporting device includes a main board body, a connecting board assembly, a first supporting body and a second supporting body, one end of the main board body is connected with one end of the connecting board assembly through a first bendable part, the other end of the connecting board assembly is connected with one end of the first supporting body through a second bendable part, the other end of the first supporting body is connected with one end of the second supporting body through a third bendable part, and the other end of the main board body is connected with the other end of the second supporting body through a fourth bendable part.

The first supporting body includes a first bottom edge, a first top edge parallel to the first bottom edge, and a first left side edge and a first right side edge connecting the first bottom edge and the first top edge respectively, and the first supporting body has a first folding line extending from the intersection point of the first bottom edge and the first left side edge to the first top edge and intersecting with the first top edge. The second supporting body includes a second bottom edge, a second top edge parallel to the second bottom edge, and a second left side edge and a second right side edge connecting the second bottom edge and the second top edge respectively, and the second supporting body has a second folding line extending from the intersection point of the second bottom edge and the second left side edge to the second top edge and intersecting with the second top edge.

The first left side edge, the first top edge and the first folding line enclose a first area, the second left side edge, the second top edge and the second folding line enclose a second area, and the first area and the second area can be bent towards the main board body together.

Both the first supporting body and the second supporting body are trapezoidal.

An angle included between the first bottom edge and the first left side edge is 45 to 90 degrees; and an angle included between the second bottom edge and the second left side edge is 45 to 90 degrees.

An angle included between the first bottom edge and the first left side edge is 60 degrees; and an angle included between the second bottom edge and the second left side edge is 60 degrees.

Both the first supporting body and the second supporting body are isosceles trapezoid.

The connecting board assembly includes more than two connecting boards, and every two adjacent connecting boards may be connected in a bendable manner.

Shapes of the first supporting body and the second supporting body are symmetrical.

The supporting device further includes a wrapping layer, wherein the wrapping layer wraps the main board body, the connecting board assembly, the first supporting body and the second supporting body.

The wrapping layer is one or more of leather, non-woven fabrics, plastics and rubber.

The wrapping layer is integrally formed.

Benefits of this application lie in that: unlike the prior art, this application provides a supporting device for a mobile terminal, the supporting device includes a main board body, a connecting board assembly, a first supporting body and a second supporting body, the first supporting body is provided with a first area and the second supporting body is provided with a second area, so that the first area and the second area can be bent towards the main board body together. The supporting device for the mobile terminal of this application is small in size and convenient to carry.

BRIEF DESCRIPTION OF THE DRAWINGS

In order to explain the technical solutions in embodiments of this application more clearly, drawings necessary in the description of the embodiments will be introduced briefly hereinafter. Obviously, the drawings in the following description are only some embodiments of this application, and for those of ordinary skill in the art, other drawings can be obtained according to these drawings without creative labors, in which.

DETAILED DESCRIPTION OF THE EMBODIMENTS

Figure 1:
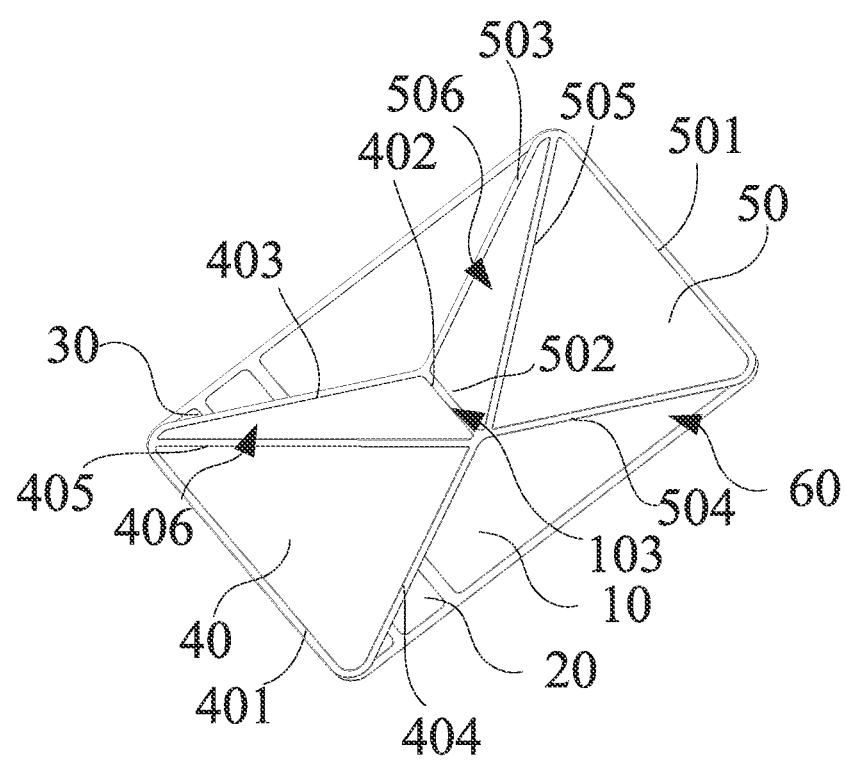
FIG. 1 is a schematic structural view of a supporting device for a mobile terminal at a viewing angle according to an embodiment of this application.

Technical solutions in embodiments of this application will be described clearly and completely with reference to the drawings in the embodiments of this application. Obviously, the embodiments described are only part but not all of the embodiments of this application. Based on the embodiments in this application, all other embodiments obtained by those of ordinary skill in the art without creative labors are within the scope claimed in this application.

It shall be noted that if there is a directional indication (such as up, down, left, right, front, back or the like) in the embodiments of this application, the directional indication is only used to explain the relative positional relationship, movement situation or the like among components in a specific posture (as shown in the attached figure), and if the specific posture changes, the directional indication will change accordingly.

In addition, if there are descriptions involving "first" and "second" in the embodiments of this application, the descriptions of "first" and "second" are only used for descriptive purposes, and should not be appreciated as indicating or implying their relative importance or implicitly indicating the number of indicated technical features. Therefore, the features defined with "first" and "second" may explicitly or implicitly include at least one of the features. In addition, the technical solutions of various embodiments may be combined with each other, but it must be based on the fact that such combination can be implemented by those of ordinary skill in the art. When the combination of technical solutions is contradictory or impossible for implementation, it should be considered that the combination of such technical solutions does not exist and is not within the scope claimed in this application.

This application provides a supporting device for a mobile terminal. The supporting device includes a main board body, a connecting board assembly, a first supporting body and a second supporting body. The connecting board assembly includes more than two connecting boards, and every two adjacent connecting boards may be connected in a bendable manner. One end of the main board body is connected with one end of the first connecting board of the connecting board assembly through a first bendable part, and one end of the last connecting board of the connecting board assembly is connected with one end of the first supporting body through a second bendable part. The other end of the first supporting body is connected with one end of the second supporting body through a third bendable part, and the other end of the main board body is connected with the other end of the second supporting body through a fourth bendable part.

In the closed state, the sum of lengths of the main board body and the connecting board assembly is equal to the sum of lengths of the first supporting body and the second supporting body. In the folded state, the supporting device can provide support at various angles by bending the connecting board. In this way, the supporting device can be small in size, convenient to carry and provide support at various angles. The case where the connecting board assembly includes two connecting boards (a first connecting board and a second connecting board) will be taken as an example for illustration hereinafter. On this basis, it is easy for those skilled in the art to conceive an implementation including more than three connecting boards, and this will not be further described herein.

Figure 2:
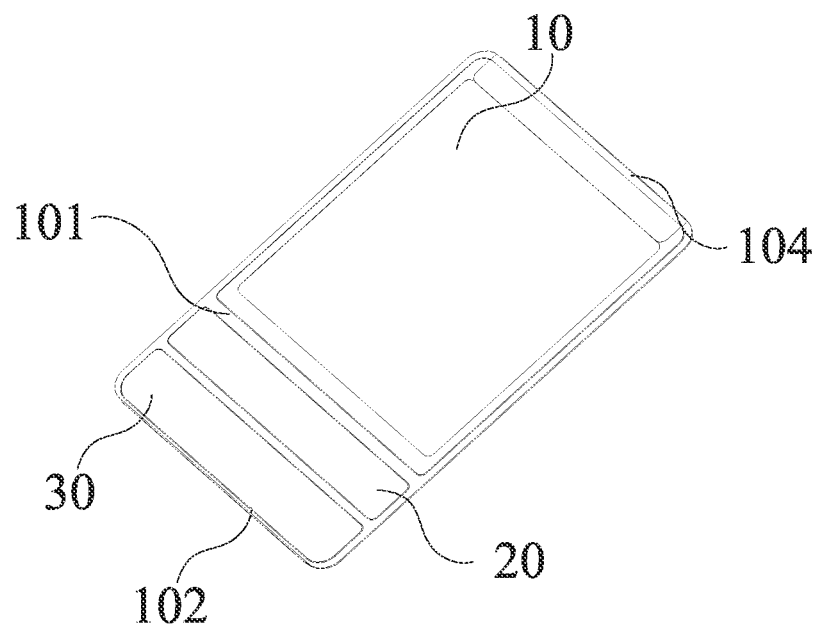
FIG. 2 is a schematic structural view of a supporting device for a mobile terminal at another viewing angle according to an embodiment of this application.

Referring to FIG. 1 and FIG. 2, FIG. 1 is a schematic structural view of a supporting device for a mobile terminal at a view angle according to an embodiment of this application, and FIG. 2 is a schematic structural view of a supporting device for a mobile terminal at another viewing angle according to an embodiment of this application. The supporting device of this application is used to support mobile terminals, including but not limited to tablet computers and notebooks. In this embodiment, the supporting device includes a main board body 10, a first connecting board 20, a second connecting board 30, a first supporting body 40 and a second supporting body 50. The first connecting board 20 and the second connecting board 30 are connected in a bendable manner. One end of the main board body 10 is connected with one end of the first connecting board 20 by a first bendable part 101, and one end of the second connecting board 30 is connected with one end of the first supporting body 40 by a second bendable part 102. The other end of the first supporting body 40 is connected with one end of the second supporting body 50 through a third bendable part 103, and the other end of the main board body 10 is connected with the other end of the second supporting body 50 through a fourth bendable part 104. In the closed state, the sum of lengths of the main board body 10, the first connecting board 20 and the second connecting board 30 is equal to the sum of lengths of the first supporting body 40 and the second supporting body 50, and the thickness of the supporting device in the closed state may be in the range of only 2 to 3 mm, thereby realizing the so-called "invisibility". In the folded state, support at two angles can be provided by the bending of the first connecting board 20 and/or the second connecting board 30. The bendable connection between the first connecting board 20 and the second connecting board 30 may be a pivot connection or it may be achieved by a bendable part as described above, and it is not limited in this application so long as the connection between the first connecting board 20 and the second connecting board 30 at a certain angle can be realized.

Further speaking, the supporting device further includes a wrapping layer 60 which wraps the main board body 10, the first connecting board 20, the second connecting board 30, the first supporting body 40 and the second supporting body 50. The wrapping layer 60 is preferably one or more of leather, non-woven fabrics, plastics and rubber, and the wrapping layer 60 is integrally formed. Wrapping with the wrapping layer 60 can provide a more integrated supporting device, with diversified appearance and materials closer to the skin. In some embodiments, the first bendable part 101, the second bendable part 102, the third bendable part 103 and the fourth bendable part 104 may be flexible parts between adjacent components, and in other embodiments, the above bendable parts may also be formed by the wrapping layer 60. That is, a "groove" is formed for example between the main board body 10 and the first connecting board 20, as shown in FIG. 1 and FIG. 2.

In this embodiment, the side of the main board body 10 away from the first supporting body 40 and the second supporting body 50 is further provided with an adhesive part (not labeled), which is used to fix the supporting device on the mobile terminal. When the supporting device is not in use, the adhesive part is stuck by an object without stickness. Of course, in other embodiments, the supporting device may also be fixed with the mobile terminal by other ways, such as by using a buckle, a hook, abutting and the like. In order to stabilize the first supporting body 40 and the second supporting body 50 in the closed state and the folded state, a magnet (not shown) is also arranged in the main board body 10, and the first supporting body 40 and/or the second supporting body 50 are preferably made of metal materials to be attracted by the magnet. Of course, in other embodiments, other ways such as bonding, buckling and the like may also be adopted.

Figure 3:
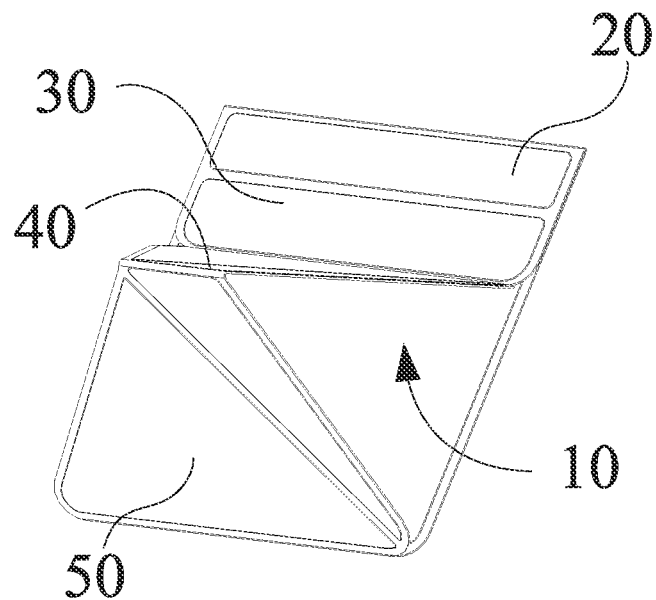
FIG. 3 is a schematic view of a folding structure of a supporting device for a mobile terminal according to an embodiment of this application.
Figure 4:
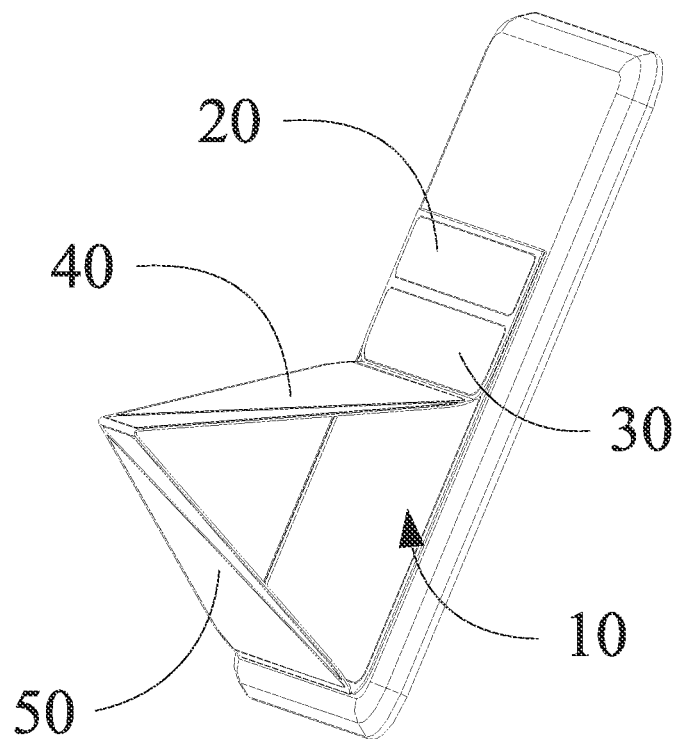
FIG. 4 is a use state diagram of the mobile terminal supported by the folding structure shown in FIG. 3.
Figure 5:
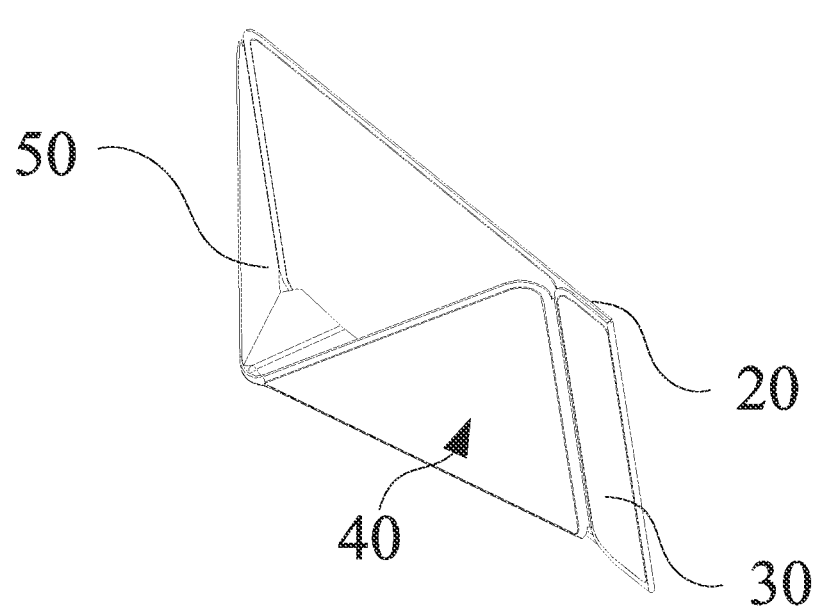
FIG. 5 is a schematic view of another folding structure of a supporting device for a mobile terminal according to an embodiment of this application.
Figure 6:
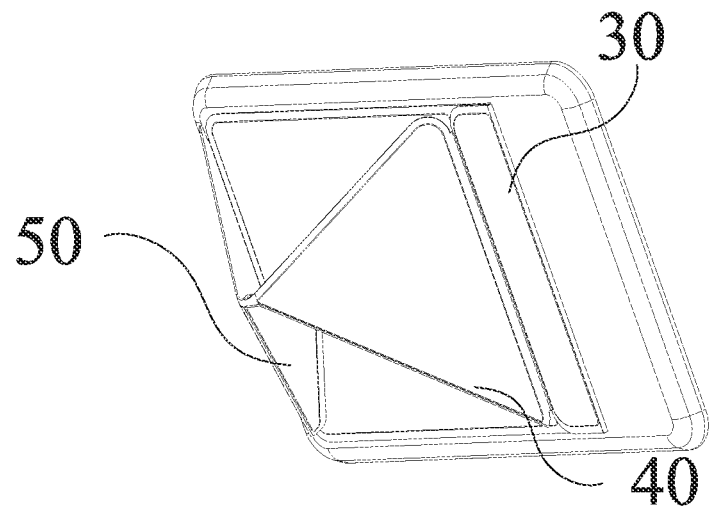
FIG. 6 is a use state diagram of the mobile terminal supported by the folding structure shown in FIG. 5.
Figure 7:
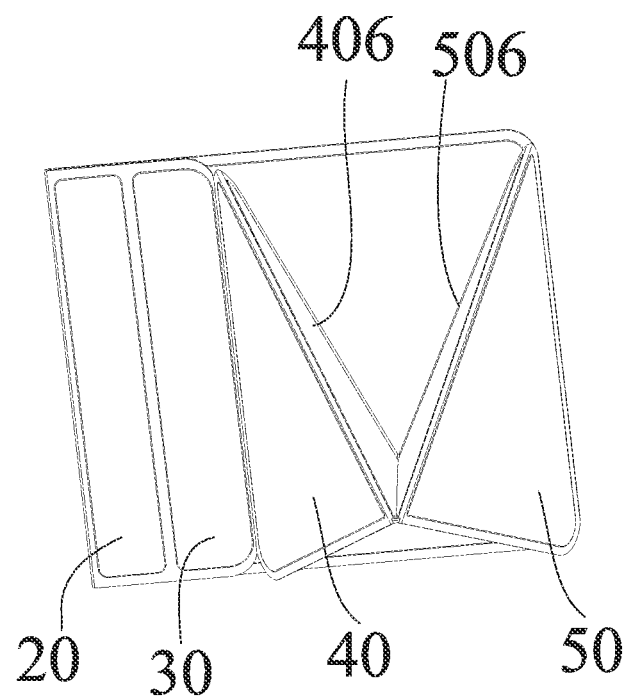
FIG. 7 is a schematic view of yet another folding structure of a supporting device for a mobile terminal according to an embodiment of this application.
Figure 8:
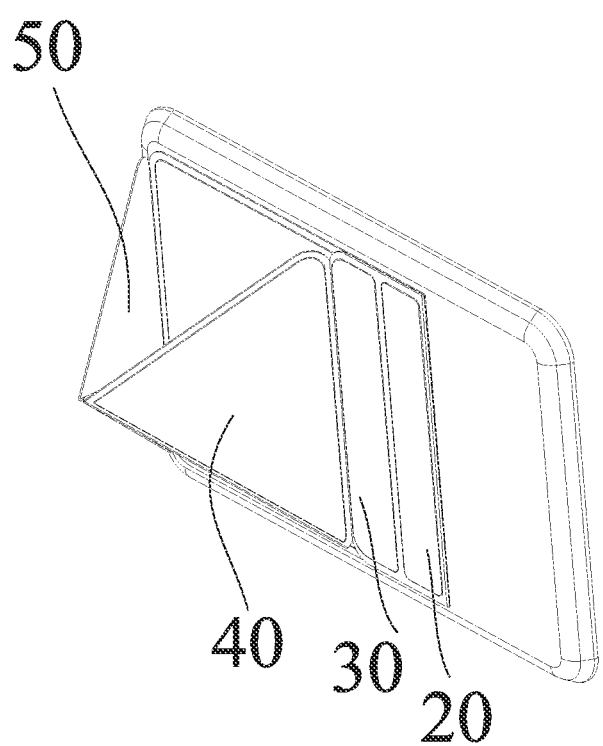
FIG. 8 is a use state diagram of the mobile terminal supported by the folding structure shown in FIG. 7.

The above-mentioned bending of the first connecting board 20 and/or the second connecting board 30 can provide support at two angles. Specifically, the supporting device of this embodiment can be used horizontally (refer to FIG. 5) or vertically (refer to FIG. 4). The support at the first angle may be that the first connecting board 20 and the second connecting board 30 are folded together, and at this point, the second supporting body 50 supports on a plane or the side surface formed by the first supporting body 40 and the second supporting body 50 supports on a plane (referring to FIG. 3 and FIG. 4). The support at the second angle may be that the first connecting board 20 is coplanar with the main board body 10, the second connecting board 30 is bent and attached to the first connecting board 20, preferably the first connecting board 20 and the second connecting board 30 are equal in width, and a magnet is arranged in the first connecting board 20, so that the second connecting board 30 can be attached to the first connecting board 20 stably.

Please refer to FIG. 5 to FIG. 8 in combination. Preferably, both the first supporting body 40 and the second supporting body 50 are trapezoidal. In this embodiment, the first supporting body 40 includes a first bottom edge 401, a first top edge 402 parallel to the first bottom edge 401, and a first left side edge 403 and a first right side edge 404 respectively connecting the first bottom edge 401 and the first top edge 402. The first supporting body 40 has a first folding line 405 extending from the intersection point of the first bottom edge 401 and the first left side edge 403 to the first top edge 402 and intersecting with the first top edge 402. The second supporting body 50 includes a second bottom edge 501, a second top edge 502 parallel to the second bottom edge 501, and a second left side edge 503 and a second right side edge 504 respectively connecting the second bottom edge 501 and the second top edge 502. The second supporting body 50 has a second folding line 505 extending from the intersection point of the second bottom edge 501 and the second left side edge 503 to the second top edge 502 and intersecting with the second top edge 502.

The first left side edge 403, the first top edge 402 and the first folding line 405 enclose a first area 406, and the second left side edge 503, the second top edge 502 and the second folding line 505 enclose a second area 506. The first area 406 and the second area 506 can be folded towards the main board body 10 together. Through this arrangement, the supporting device has two supporting angles when it provides lateral support. Combining the two angles of the first connecting board 20 and/or the second connecting board 30, the supporting device of this embodiment can provide support at four angles. The folding lines may also be adjusted by those skilled in the art according to the actual situation, so that the supporting device provides support at more different angles.

Therefore, in other embodiments, the first connecting board 20 and the second connecting board 30 may also be integrated. That is, there is only one connecting board, and support at different angles is achieved by the adjustment of the above folding lines.

Preferably, an angle included between the first bottom edge 401 and the first left side edge 403 is 45 to 90 degrees; and an angle included between the second bottom edge 501 and the second left side edge 503 is 45 to 90 degrees. It is further preferable that the angle included between the first bottom edge 401 and the first left side edge 403 is 60 degrees, and the angle included between the second bottom edge 501 and the second left side edge 503 is 60 degrees. Such angle setting can provide the folding line with a larger design choice space. It shall be noted that the angle included between the first bottom edge 401 and the first right side edge 404 and the angle included between the second bottom edge 501 and the second right side edge 504 can be set according to the same principle, which is not limited in this application. Of course, similar foldable areas may also be provided on the first right side edge 404 and the second right side edge 504 by those skilled in the art according to the actual situation with reference to the above principle, which is not limited in this application.

Preferably, shapes of the first supporting body 40 and the second supporting body 50 are symmetrical.

Preferably, both the first supporting body 40 and the second supporting body 50 are isosceles trapezium, but they may also be arranged by those skilled in the art according to the actual situation.

The supporting device of this application has the following advantages:
1. The bending of the folding lines and the bending between the connecting board assembly can together realize the support adjustment at multiple angles, and the supporting device provides a good supporting effect, simple and convenient support adjustment, and it can be used horizontally and vertically;
2. When the supporting device is closed, there are only two layers, and the thickness can reach 2 to 3 mm, thus realizing "invisibility" to a certain extent; and the supporting device is small in size and convenient for storage;
3. The structure of the board body is wrapped by the wrapping layer, which is compact and integrated in the structure.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:
1. A supporting device for a mobile terminal, comprising a main board body, a connecting board assembly, a first supporting body and a second supporting body, wherein a first end of the main board body is connected with a first end of the connecting board assembly through a first bendable part, a second end of the connecting board assembly is connected with a first end of the first supporting body through a second bendable part, a second end of the first supporting body is connected with a first end of the second supporting body through a third bendable part, and a second end of the main board body is connected with a second end of the second supporting body through a fourth bendable part; wherein the first supporting body comprises a first bottom edge, a first top edge parallel to the first bottom edge, and a first left side edge and a first right side edge connecting the first-bottom edge and the first top edge, respectively, and the first supporting body has a first folding line extending from an intersection point of the first bottom edge and the first left side edge to the first top edge and intersecting with the first top edge; the second supporting body comprises a second bottom edge, a second top edge parallel to the second bottom edge, and a second left side edge and a second right side edge connecting the second bottom edge and the second top edge, respectively, and the second supporting body has a second folding line extending from an intersection point of the second bottom edge and the second left side edge to the second top edge and intersecting with the second top edge; wherein the first left side edge, the first top edge and the first folding line enclose a first area, the second left side edge, the second top edge and the second folding line enclose a second area, and the first area and the second area are configured for being bent towards the main board body together.

2. The supporting device of claim 1, wherein the first supporting body and the second supporting body are trapezoidal.

3. The supporting device of claim 2, wherein an angle comprised between the first bottom edge and the first left side edge is 45 to 90 degrees; and an angle comprised between the second bottom edge and the second left side edge is 45 to 90 degrees.

4. The supporting device of claim 3, wherein the angle comprised between the first bottom edge and the first left side edge is 60 degrees; and the angle comprised between the second bottom edge and the second left side edge is 60 degrees.

5. The supporting device of claim 2, wherein each of the first supporting body and the second supporting body is an isosceles trapezoid.

6. The supporting device of claim 1, wherein the connecting board assembly comprises more than two connecting boards, and each two adjacent connecting boards of the more than two connecting boards are configured for being connected in a bendable manner.

7. The supporting device of claim 6, wherein the connecting board assembly comprises the first connecting board and the second connecting board, in the folded state, the first connecting board is coplanar with the main board body, the second connecting board is bent and attached to the first connecting board.

8. The supporting device of claim 1, wherein a shape of the first supporting body and a shape of the second supporting body are symmetrical.

9. The supporting device of claim 1, further comprising a wrapping layer, wherein the wrapping layer wraps the main board body, the connecting board assembly, the first supporting body and the second supporting body.

10. The supporting device of claim 9, wherein the wrapping layer is one or more of leather, non-woven fabrics, plastics and rubber.

11. The supporting device of claim 10, wherein the wrapping layer is integrally formed.

12. The supporting device of claim 1, in the folded state, where in the first area and the second area are bent towards the main board body together, which makes the supporting device has two supporting angles when it provides lateral support.

* * * * *